(12) United States Patent
Kasturi et al.

(10) Patent No.: US 8,503,989 B2
(45) Date of Patent: Aug. 6, 2013

(54) DYNAMIC CONTACT LIST

(75) Inventors: Rohini Kasturi, Livermore, CA (US);
Sravan Vadlakonda, Sunnyvale, CA
(US); Alpesh Patel, Pleasanton, CA
(US); Matthew Kuhlke, San Francisco,
CA (US)

(73) Assignee: Cisco Technology, Inc., San Jose, CA
(US)

( * ) Notice: Subject to any disclaimer, the term of this
patent is extended or adjusted under 35
U.S.C. 154(b) by 1166 days.

(21) Appl. No.: 11/876,498

(22) Filed: Oct. 22, 2007

(65) Prior Publication Data

US 2009/0104895 A1 Apr. 23, 2009

(51) Int. Cl.
*H04L 29/08765* (2006.01)

(52) U.S. Cl.
USPC ........ 455/414.1; 455/418; 455/519; 455/466;
370/230

(58) Field of Classification Search
USPC .............. 455/414.1, 566, 550, 517–519, 418,
455/466; 370/230
See application file for complete search history.

(56) References Cited

U.S. PATENT DOCUMENTS

| | | | | |
|---|---|---|---|---|
| 6,075,992 | A * | 6/2000 | Moon et al. | 455/455 |
| 6,590,967 | B1 * | 7/2003 | Marchand et al. | 379/114.14 |
| 7,016,855 | B2 * | 3/2006 | Eaton et al. | 705/26.62 |
| 7,233,650 | B1 | 6/2007 | Canny | |
| 7,243,075 | B1 * | 7/2007 | Shaffer et al. | 705/7.34 |
| 7,327,834 | B1 * | 2/2008 | Hiers et al. | 379/88.18 |
| 7,463,909 | B1 | 12/2008 | Toebes | |
| 7,596,597 | B2 | 9/2009 | Liu et al. | |
| 7,673,327 | B1 | 3/2010 | Polis et al. | |
| 7,827,208 | B2 | 11/2010 | Bosworth et al. | |
| 8,346,208 | B2 * | 1/2013 | Chiou et al. | 455/405 |
| 2002/0097856 | A1 | 7/2002 | Wullert, II | |
| 2004/0227629 | A1 * | 11/2004 | Adamczyk et al. | 340/539.18 |
| 2005/0020269 | A1 * | 1/2005 | Jedlicka | 455/445 |
| 2005/0083915 | A1 * | 4/2005 | Mathew et al. | 370/352 |
| 2005/0159970 | A1 | 7/2005 | Buyukkokten et al. | |
| 2005/0175021 | A1 * | 8/2005 | Ozugur et al. | 370/401 |
| 2005/0262563 | A1 * | 11/2005 | Mahone et al. | 726/22 |
| 2006/0035632 | A1 * | 2/2006 | Sorvari et al. | 455/418 |
| 2006/0036762 | A1 | 2/2006 | Vadlakonda et al. | |
| 2006/0041663 | A1 * | 2/2006 | Brown et al. | 709/226 |
| 2006/0058948 | A1 * | 3/2006 | Blass et al. | 701/207 |
| 2006/0075432 | A1 * | 4/2006 | Abbadessa et al. | 725/46 |
| 2006/0085419 | A1 * | 4/2006 | Rosen | 707/9 |
| 2006/0136584 | A1 * | 6/2006 | Decker et al. | 709/224 |
| 2006/0161599 | A1 * | 7/2006 | Rosen | 707/201 |
| 2006/0209690 | A1 * | 9/2006 | Brooke | 370/230 |
| 2006/0211435 | A1 * | 9/2006 | Nielsen et al. | 455/466 |
| 2006/0256959 | A1 * | 11/2006 | Hymes | 379/433.04 |
| 2006/0265347 | A1 | 11/2006 | Caballero-McCann et al. | |
| 2006/0285533 | A1 * | 12/2006 | Divine et al. | 370/352 |
| 2007/0004385 | A1 | 1/2007 | Horvitz et al. | |
| 2007/0025543 | A1 | 2/2007 | Vadlakonda et al. | |
| 2007/0150444 | A1 * | 6/2007 | Chesnais et al. | 707/3 |
| 2007/0150583 | A1 | 6/2007 | Asthana et al. | |

(Continued)

*Primary Examiner* — Kathy Wang-Hurst
*Assistant Examiner* — Mong-Thuy Tran
(74) *Attorney, Agent, or Firm* — Brinks Hofer Gilson &
Lione

(57) ABSTRACT

In one embodiment, a system receives a user calling attribute
and determines current information of a telephone. The user
calling attribute may be derived from a calling routine of a
user such as dates and/or times that the user has previously
called particular contacts. The system generates a dynamic
contact list based on the user calling attribute and the current
information.

20 Claims, 2 Drawing Sheets

(56) References Cited

U.S. PATENT DOCUMENTS

| | | | |
|---|---|---|---|
| 2007/0167136 A1* | 7/2007 | Groth | 455/41.2 |
| 2007/0180060 A1 | 8/2007 | Patel et al. | |
| 2007/0226184 A1* | 9/2007 | Diraimondo et al. | 707/3 |
| 2007/0230675 A1* | 10/2007 | Marchand et al. | 379/114.14 |
| 2007/0255807 A1 | 11/2007 | Hayashi et al. | |
| 2007/0271328 A1* | 11/2007 | Geelen et al. | 709/201 |
| 2008/0045236 A1* | 2/2008 | Nahon et al. | 455/456.1 |
| 2008/0056269 A1* | 3/2008 | Madhani et al. | 370/395.2 |
| 2008/0079566 A1* | 4/2008 | Singh et al. | 340/539.13 |
| 2008/0133580 A1* | 6/2008 | Wanless et al. | 707/102 |
| 2008/0148320 A1* | 6/2008 | Howcroft | 725/61 |
| 2008/0155080 A1 | 6/2008 | Marlow et al. | |
| 2008/0155471 A1* | 6/2008 | Lynn et al. | 715/811 |
| 2008/0188261 A1* | 8/2008 | Arnone | 455/550.1 |
| 2008/0195312 A1* | 8/2008 | Aaron et al. | 701/209 |
| 2008/0291022 A1* | 11/2008 | Amador et al. | 340/572.1 |
| 2009/0076820 A1* | 3/2009 | Paik | 704/260 |
| 2009/0213001 A1* | 8/2009 | Appelman et al. | 342/357.07 |
| 2010/0153487 A1* | 6/2010 | Greven et al. | 709/203 |

* cited by examiner

DYNAMIC CONTACT LIST

TECHNICAL FIELD

The present disclosure relates generally to telephones and other telecommunication devices.

BACKGROUND

In telephony and other areas, user devices frequently include a "contact list", which is a list of shortcuts or identifiers of other users to facilitate an easy connection to the users. For example, telephones typically include contact lists of potential called parties so that the calling party at the telephone can choose one of the contacts to initiate a telephone call to the corresponding called party without having to memorize and dial the telephone number of the called party. Similarly, instant messaging system devices have contact lists or buddy lists so that a user across a network can be contacted without having to know the user's network address or other identifying information.

DESCRIPTION OF EXAMPLE EMBODIMENTS

Overview

One embodiment is a system that receives a user calling attribute and determines current information of a telephone. The system generates a dynamic contact list based on the user calling attribute and the current information.

Example Embodiments

One embodiment is a telephone or other device that generates a dynamic contact list based on current information and user calling attributes such as location, time of day, etc. The dynamic contact list can be a smaller list than a general contact list so that the user can quickly access the most relevant contacts.

Figure 1:
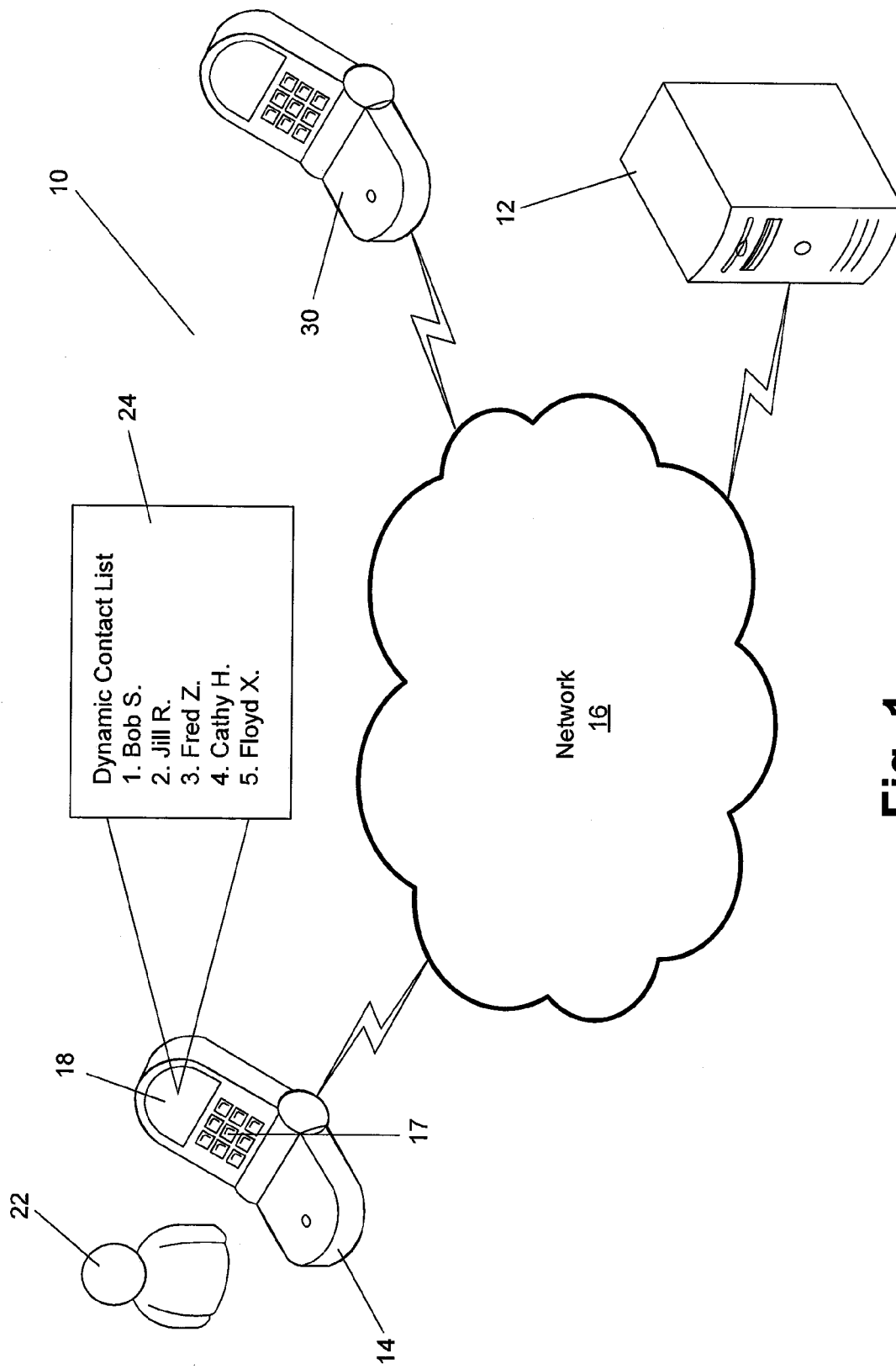
FIG. 1 is a block diagram of a communication system in accordance with one embodiment.

FIG. 1 is a block diagram of a communication system 10 in accordance with one embodiment. System 10 includes a telephone 14 that is used by a user 22 and that is coupled to a network 16. Telephone 14 can be any type of telephone that allows a calling party user to initiate a telephone call to a called party. Examples of telephone 14 include a cellular telephone, a Voice Over Internet Protocol ("VOIP") telephone, a Plain Old Telephone Service ("POTS") telephone, etc. Telephone 14 may include a keypad 17 and a display 18, or any other mechanism that functions as a user interface. Telephone 14 further includes a processor, memory for storing instructions to be executed by the processor and for storing other data, and a global positioning system ("GPS") for determining the geographic location of telephone 14. Telephone 14 further includes software/hardware for performing all needed telecommunication functions, and software/hardware for determining a current time.

Telephone 14 is coupled to a network 16. Network 16 can be any type of telecommunication network that allows a calling party at telephone 14 to be connected to a called party at any location. Examples of network 16 include a wireless cellular network, a wireless local area network, an Internet Protocol ("IP") network, a Public Switched Telephone Network ("PSTN"), etc., or a combination of different types of networks. In one embodiment, telephone 14 is coupled to network 16 through a wireless connection so that telephone 14 is mobile.

System 10 further includes a server 12 coupled to network 16. Server 12 includes a processor and a memory that stores instructions that are executed by the processor, as well as other data. Server 12, through network 16, is coupled to telephone 14. Server 12 may also be directly coupled to telephone 14 or coupled to telephone 14 using any other method. The functionality of server 12 may also be incorporated within telephone 14. System 10 further includes a called party telephone 30 that can be called by user 22 at telephone 14 when initiating a telephone call or other network connection to a called party.

In one embodiment, telephone 14 or server 12 determine "user calling attributes" of a user of telephone 14 and store the user calling attributes at server 12 and/or telephone 14. User calling attributes may be generated and stored whenever user 22 initiates a call to a called party at telephone 14. One user calling attribute may be, for each call initiated by a user of telephone 14, the geographic location of telephone 14 when the call was initiated, and the corresponding called party. Another user calling attribute may be, for each call initiated by the user of telephone 14, the time of day of the call and the corresponding called party. Another user calling attribute may be the number of times a particular called party is called each hour, day, month, etc. Any possible combination of the above, or any other attribute of a user's call may be considered "user calling attributes" in additional embodiments. The user calling attributes may be stored in a database coupled to server 12 or telephone 14.

The user calling attributes will typically reflect the calling routines of user 22 at telephone 14. For example, a user may: (1) call her family every evening between 5 p.m. and 6 p.m. on every weekday if she is at work; (2) call her work number or a conference server for a status meeting at the same time in the morning when traveling; (3) call an airline to check the status of a flight every Friday evening and Monday morning, and do this even more frequently when traveling away from her home location; and (4) call her mother every Saturday morning and spouse every evening during workdays. These are all calling routines of the user and are reflected in the user calling attributes which track all calls, or a predefined portion of the calls, based on location, time, calling parties, etc.

Telephone 14 can display a "full" overall contact list on display 18 to make it easier for user 22 at telephone 14 to initiate a telephone call. The full contact list may be an alphabetical list of all contacts that have been stored on telephone 14. Depending on the number of stored contacts, this list can be very long (e.g., greater than 100 contacts) and therefore the user must frequently scroll through a large number of contacts to find the desired contact.

In contrast, in one embodiment, server 12 generates a "dynamic" contact list 24 from the user calling attributes and sends it to telephone 14 for displaying on display 18. Dynamic contact list 24 can be generated and shown on display 18 when telephone 14 is activated by, for example, opening a flip phone, powering on the phone, waking the phone from sleep mode, automatically activating at a predetermined time, etc. It also may be generated and displayed at other times besides at activation. Dynamic contact list 24 in one embodiment is a subset of the full contact list and therefore is much smaller. For example, dynamic contact list 24 shown in FIG. 1 includes five contacts. The smaller list makes it easier for user 22 to select the desired contact. In one embodiment, user 22 can initiate a telephone call to one of the contacts by selecting a contact and hitting a send button using keyboard 17. The content of dynamic content list 24 in one embodiment is the result of system 10 inferring what call a user is likely to make when they activate telephone 14. This inference in one embodiment is based on the user's previous actions or routines.

In one embodiment, the user calling attributes are used to select the contacts that populate dynamic contact list 24. In one embodiment, the user calling attributes are a list of locations from the GPS that user 22 initiates calls from, and for each location the calling parties that are typically called. In this embodiment, system 10 will determine the current location of telephone 14, and generate the list of contacts that are typically called from that location. Dynamic contact list 24 will then display the list of contacts. The contacts will be the most likely contacts that the user would call from the current location, and therefore the most relevant. The user can select a contact from dynamic contact list 24, or can request the entire contact list if the desired called party is not part of dynamic contact list 24.

In another embodiment, the user calling attributes will indicate who the user typically calls at a particular time of day. For example, a user may typically call her spouse at 6:00 p.m. on a weekday when work is over, or a user may typically call work contacts during working hours, and family and friends during non-working hours. In this embodiment, system 10 will determine the current time and generate dynamic contact list 24 based on current time.

In another embodiment, the user calling attributes will indicate an order that calling parties are typically called and system 10 will enable dynamic contact list 24 to be generated based on who user 22 has called recently. For example, a user may typically call their siblings one after another, so after the first sibling is called, dynamic contact list 24 may comprise the remaining siblings.

In another embodiment, the user calling attributes can be used to generate a reminder to user 22 to initiate a call. For example, if the user calling attributes indicate that the user always calls her spouse at 6 p.m., a reminder at 6 p.m. such as a vibration on telephone 14 can be generated to remind user 22 to initiate the call to her spouse. The call may also be automatically initiated, or the potentially called party may be sent a reminder if the call is not initiated, via text messaging, e-mail, or other methods.

Figure 2:
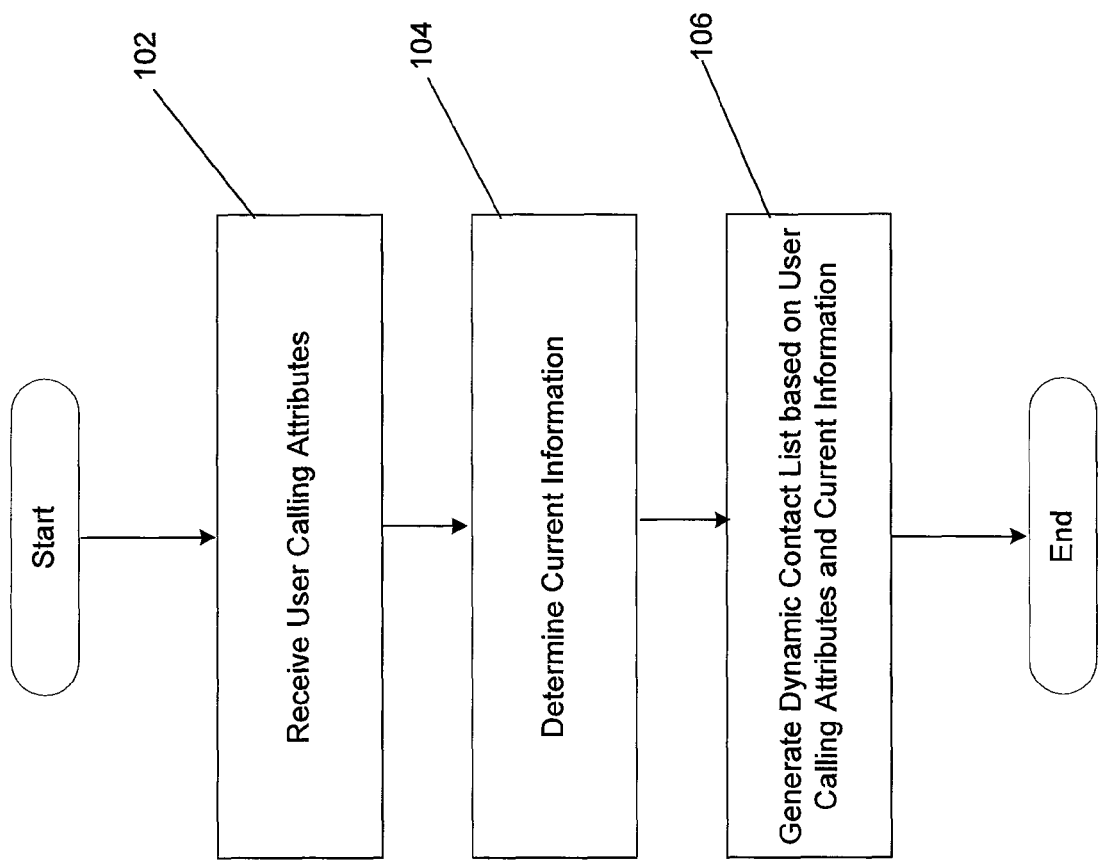
FIG. 2 is a flow diagram of the functionality of the communication system in accordance with one embodiment when generating a dynamic contact list.

FIG. 2 is a flow diagram of the functionality of communication system 10 in accordance with one embodiment when generating a dynamic contact list. In one embodiment, the functionality of the flow diagram of FIG. 2 is implemented by software stored in memory or other computer readable or tangible medium, and executable by a processor. In other embodiments, the functionality can be performed by hardware, or any combination of hardware and software.

At 102, user calling attributes are received. In one embodiment, the user calling attributes are generated for each call initiated on telephone 14 and are stored on server 12 in a database.

At 104, the current information of telephone 14 is determined. The current information can be determined when telephone 14 is activated or at any other time. The current information may include the geographic location of telephone 14, the time of day, the date, the identity of user 22, etc.

At 106, dynamic contact list 24 is generated based on the user calling attributes and the current information. Dynamic contact list 24 is displayed to user 22 who can then select one of the contacts to initiate a telephone call. In one embodiment, the user calling attributes are stored in a database and are queried based on the current information, and the most likely X number of contacts is selected to populate dynamic contact list 24, where X is a predetermined number.

In one embodiment, the storing of user calling attributes and the generation of dynamic contact list 24 is provided by server 12, which can be controlled by a service provider that can sell the dynamic contact list generation as a service to a user of telephone 14. In other embodiments, generation of dynamic contact list 24 can occur on telephone 14 or in some other location of system 10.

As disclosed, embodiments of the present invention generate a dynamic contact list that includes the most relevant contacts for a user of telephone 14. As a result, a user at telephone 14 can easily select the desired contact and initiate a telephone call.

Several embodiments are specifically illustrated and/or described herein. However, it will be appreciated that modifications and variations of are covered by the above teachings and within the purview of the appended claims without departing from the spirit and intended scope of the invention.

For example, although telephone 14 includes a display 18 for displaying dynamic contact list 24, a telephone without a display can also be used by, for example, providing an audio list of contacts and allowing user interaction through an Interactive Voice Response system. Further, the dynamic contact list can be used with a device other than a telephone. For example, the dynamic contact list can be a list of contacts for an instant messaging system and the user calling attributes would be instant messaging attributes.

What is claimed is:

1. A method comprising:
    storing attributes from a plurality of past phone calls to one or more recipients by a user, where the attributes include the one or more recipients of the plurality of past phone calls and one or more locations of the user during times of initiation of the plurality of past phone calls;
    indicating a routine based on the stored attributes;
    generating one or more reminders for the one or more recipients according to the routine; and
    sending the one or more reminders to the one or more recipients according to the routine.

2. The method of claim 1, wherein the stored attributes include one or more initiation times of the plurality of past phone calls.

3. The method of claim 1, comprising: generating a dynamic contact list including at least one of the one or more recipients according to the routine.

4. The method of claim 3, wherein the dynamic contact list is a subset of an overall contact list.

5. The method of claim 3, wherein the generating the dynamic contact list comprises querying a database on a server.

6. The method of claim 3, wherein the dynamic contact list includes the one or more recipients in an order determined by comparing calling times of the plurality of past phone calls to a current time.

7. The method of claim 3, further comprising: displaying the one or more reminders with the dynamic contact list.

8. The method of claim 1, further comprising: determining the one or more locations of the user during times of initiation of the plurality of past phone calls.

9. The method of claim 1, further comprising: generating one or more reminders for the user according to the routine.

10. The method of claim 1, wherein the one or more reminders for the one or more recipients include the one or more locations of the user during times of initiation of the plurality of past phone calls.

11. An apparatus comprising:
a storage device operable to store attributes from a plurality of past phone calls by a user to one or more recipients, where the attributes include the one or more recipients of the plurality of past phone calls and one or more locations of the user during times of initiation of the plurality of past phone calls;
a processor operable to:
indicate a routine based on the stored attributes; and
generate one or more reminders for the one or more recipients according to the routine; and
a transmitter operable to send the one or more reminders to the one or more recipients according to the routine.

12. The apparatus of claim 11, wherein the stored attributes include one or more initiation times of the plurality of past phone calls.

13. The apparatus of claim 11, wherein the processor is also operable to generate a dynamic contact list including at least one of the one or more recipients according to the routine.

14. The apparatus of claim 13, wherein the dynamic contact list is a subset of an overall contact list.

15. The apparatus of claim 13, wherein the dynamic contact list includes the one or more recipients in an order determined by comparing calling times of the plurality of past phone calls to a current time.

16. The apparatus of claim 11, wherein the processor is further operable to determine the one or more locations of the user during times of initiation of the plurality of past phone calls.

17. The apparatus of claim 11, wherein the processor is further operable to:
generate one or more reminders for the user according to the routine; and
send the one or more reminders for the user to the transmitter according to the routine, wherein the transmitter is further operable to send the one or more reminders for receipt by one or more telephones of the user.

18. A non-transitory computer readable media having encoded logic for execution by a computer, the computer readable media comprising:
logic to store attributes from a plurality of past phone calls to one or more recipients by a user, where the attributes include the one or more recipients of the plurality of past phone calls and one or more locations of the user during times of initiation of the plurality of past phone calls;
logic to indicate a routine based on the stored attributes;
logic to generate one or more reminders for the one or more recipients according to the routine; and
logic to send the one or more reminders to the one or more recipients according to the routine.

19. The computer readable media of claim 18, further comprising logic to generate a dynamic contact list including at least one of the one or more recipients according to the routine.

20. The computer readable media of claim 19, further comprising logic to determine an order of the one or more recipients in the dynamic contact list by comparing calling times of the plurality of past phone calls to a current time.

* * * * *